US012753006B2

(12) United States Patent
Gilje

(10) Patent No.: US 12,753,006 B2
(45) Date of Patent: Oct. 6, 2026

(54) VEHICLE-PORTABLE GRID ASSESSMENT DEVICE

(71) Applicant: Autostore Technology AS, Nedre Vats (NO)

(72) Inventor: Kjetil Gilje, Sandeid (NO)

(73) Assignee: AutoStore Technology AS, Nedre Vats (NO)

(*) Notice: Subject to any disclaimer, the term of this patent is extended or adjusted under 35 U.S.C. 154(b) by 161 days.

(21) Appl. No.: 18/707,742

(22) PCT Filed: Nov. 2, 2022

(86) PCT No.: PCT/EP2022/080513
§ 371 (c)(1),
(2) Date: May 6, 2024

(87) PCT Pub. No.: WO2023/083658
PCT Pub. Date: May 19, 2023

(65) Prior Publication Data

US 2025/0223105 A1 Jul. 10, 2025

(30) Foreign Application Priority Data

Nov. 10, 2021 (NO) .................................... 20211355

(51) Int. Cl.

| | |
|---|---|
| ***B65G 1/04*** | (2006.01) |
| ***B65G 1/06*** | (2006.01) |
| ***B65G 61/00*** | (2006.01) |

(52) U.S. Cl.
CPC ......... *B65G 1/0464* (2013.01); *B65G 1/0478* (2013.01); *B65G 1/065* (2013.01); *B65G 61/00* (2013.01); *B65G 2201/0235* (2013.01); *B65G 2203/041* (2013.01)

(58) Field of Classification Search
CPC .... B65G 1/0464; B65G 1/0478; B65G 1/065; B65G 61/00; B65G 2201/0235; B65G 2203/041
See application file for complete search history.

(56) References Cited

U.S. PATENT DOCUMENTS

| | | | | |
|---|---|---|---|---|
| 2002/0194986 A1* | 12/2002 | Kato | ...................... | G10H 1/344 84/744 |
| 2003/0035244 A1* | 2/2003 | Wauke | ............... | G11B 17/0282 360/99.04 |
| 2021/0086782 A1* | 3/2021 | Austrheim | ........... | B65G 1/0492 |

FOREIGN PATENT DOCUMENTS

| | | |
|---|---|---|
| NO | 317366 B1 | 10/2004 |
| NO | 20210162 A1 | 8/2022 |

(Continued)

OTHER PUBLICATIONS

JP Merlet, Structural synthesis and architectures, 2006, p. 19-24 (Year: 2006).*

(Continued)

*Primary Examiner* — Ibrahim N El-Bathy
(74) *Attorney, Agent, or Firm* — Baker Botts L.L.P.

(57) ABSTRACT

A vehicle-portable grid assessment device is capable of being lowered onto a rail system device for assessing a top of a framework structure of a storage grid in an automated storage and retrieval system. The framework structure includes a rail system. The rail system includes a first set of parallel rails arranged to guide movement of a container handling vehicle in a first direction across the top of the framework structure, and a second set of parallel rails arranged perpendicular to the first set of rails to guide movement of the container handling vehicle in a second direction across the top of the framework structure that is perpendicular to the first direction. The first and second sets of parallel rails dividing the rail system into a plurality of (Continued)

grid cells. The framework structure includes upright members to support the rail-system and at least one container handling vehicle operating on the rail system. The device includes a body with a pivoting arm on at least one side. Each pivoting arm is positioned in the center on each side. Each pivoting arm has a rail contactor at either end and is pivoted around a central point of the pivoting arm corresponding to a balance point of the device. There is a tilt sensor attached to at least one of the pivoting arms for measuring the angle of the pivoting arm in relation to a horizontal level.

22 Claims, 7 Drawing Sheets

(56) References Cited

FOREIGN PATENT DOCUMENTS

| | | | |
|---|---|---|---|
| TW | 202334012 | A | 9/2023 |
| WO | 2014075937 | A1 | 5/2014 |
| WO | 2014090684 | A1 | 6/2014 |
| WO | 2015193278 | A1 | 12/2015 |
| WO | 2017153583 | A1 | 9/2017 |
| WO | 2018146304 | A1 | 8/2018 |
| WO | 2019206487 | A1 | 10/2019 |
| WO | 2019238681 | A1 | 12/2019 |
| WO | 2022034128 | A1 | 2/2022 |
| WO | 2022112166 | A1 | 6/2022 |

OTHER PUBLICATIONS

International Search Report issued in International Application No. PCT/EP2022/080513, mailed Mar. 28, 2023 (3 pages).
Written Opinion issued in International Application No. PCT/EP2022/080513; Dated Mar. 28, 2023 (5 pages).
Office Action issued in Norwegian Application No. 20211355; Dated Jun. 10, 2022 (3 pages).
Search Report issued in Norwegian Application No. 20211355; Dated Jun. 10, 2022 (2 pages).
Matray, Jean-Francois, examining communication in European Patent Office application 22813908.5, mailed Jun. 11, 2025, 3 pages, pub. by European Patent Office, Rijswijk, Netherlands.

* cited by examiner

VEHICLE-PORTABLE GRID ASSESSMENT DEVICE

FIELD OF THE INVENTION

The present invention relates to an automated storage and retrieval system for storage and retrieval of containers, in particular to a vehicle portable grid assessment device for assessing the levelness of the grid.

BACKGROUND AND PRIOR ART

FIG. 1 discloses a typical prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301,401 comprises a vehicle body 201*a*, 301*a*,401*a* and first and second sets of wheels 201*b*,301*b*,201*c*,301*c*,401*b*,401*c* which enable the lateral movement of the container handling vehicles 201,301,401 in the X direction and in the Y direction, respectively. In FIGS. 2, 3 and 4 two wheels in each set are fully visible. The first set of wheels 201*b*, 301*b*,401*b* is arranged to engage with two adjacent rails of the first set 110 of rails, and the second set of wheels 201*c*, 301*c*,401*c* is arranged to engage with two adjacent rails of the second set 111 of rails. At least one of the sets of wheels 201*b*,301*b*,201*c*,301*c*,401*b*,401*c* can be lifted and lowered, so that the first set of wheels 201*b*, 301*b*, 401*b* and/or the second set of wheels 201*c*,301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body 201*a* in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing.

These grooves and upwardly protruding elements are collectively known as tracks. Each rail may comprise one track, each rail may comprise two parallel tracks, or the rails may comprise one track rails in one direction and two parallel tracks in the other of the X and Y directions.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

US 2021/0086782 A1 discloses a framework structure of a storage grid in an automated storage and retrieval system, wherein the framework structure comprises a rail system comprising a first set of parallel rails arranged to guide movement of a container handling vehicle in a first direction (X) across the top of the framework structure, and a second set of parallel rails arranged perpendicular to the first set of rails to guide movement of the container handling vehicle in a second direction (Y) across the top of the framework structure that is perpendicular to the first direction (X).

The first and the second sets of parallel rails dividing the rail system into a plurality of grid cells. The framework structure comprising upright members to support the rail system and at least one container handling vehicle operating on the rail system. does not show a vehicle-portable grid assessment device that can be lowered onto the rail system device for assessing a top framework structure of the storage grid in an automated storage and retrieval system wherein the device comprises a body with a pivoting arm on at least one side, each pivoting arm is positioned in the center on each side, having a rail contactor at either end and being pivoted around a central point of the pivoting arm corresponding to a balance point of the device. The document US 2021/0086782 A1 does not disclose a tilt sensor attached to at least one of the pivoting arms for measuring the angle of the pivoting arm in relation to a horizontal level.

After a long period of use, the grid on top of the storage and retrieval unit might begin to become uneven. An uneven grid can be caused by several things, but it is usually due to the upright members shifting or getting damaged in some way or the tracks might get knocked out of shape or get disjointed.

When the grid becomes uneven there is a danger of the container handling vehicles getting damaged or even becoming derailed which would result in damages to both the container handling vehicle and the grid, and it would require the grid to shut down until the area was cleared and fixed. This would be a huge loss in income.

There is therefore a market for a storage and retrieval grid where there is a way of checking the grid for uneven areas before there is an accident. This would make it possible to give the operator a possibility to monitor how the track is aging and warn of any need for maintenance.

SUMMARY OF THE INVENTION

The present invention is set forth and characterized in the independent claims, while the dependent claims describe other characteristics of the invention.

In one aspect, the invention relates to a vehicle-portable grid assessment device that can be lowered onto the rail system device for assessing a top of a framework structure of a storage grid in an automated storage and retrieval system, wherein the framework structure comprises a rail system comprising a first set of parallel rails arranged to guide movement of a container handling vehicle in a first direction (X) across the top of the framework structure, and a second set of parallel rails arranged perpendicular to the first set of rails to guide movement of the container handling vehicle in a second direction (Y) across the top of the framework structure that is perpendicular to the first direction (X), the first and second sets of parallel rails dividing the rail system into a plurality of grid cells, the framework structure comprising upright members to support the rail-system and at least one container handling vehicle operating on the rail system, where the device comprises a body with a pivoting arm on at least one side, and each pivoting arm is positioned in the center on each side, each pivoting arm having a rail contactor at either end and being pivoted around a central point of the pivoting arm corresponding to a balance point of the device, and there is an tilt sensor attached to at least one of the pivoting arms for measuring the angle of the pivoting arm in relation to a horizontal level.

Also, the rail contactors are either feet or wheels that rest in the tracks of the rails when it is performing the measurements and the device is lifted and lowered onto a grid cell by the lifting platform of a container handling vehicle.

The device communicates wirelessly with a container handling vehicle carrying the device, the platform communicates wirelessly with a central control unit and the platform communicates with a container handling vehicle carrying the device via grippers on a lifting platform.

Further, at least one camera can be attached to the underside of the platform for inspecting gaps between the rails and the upright members, a robotic arm with tools can be attached to the underside of the body for mending gaps between the rails of the grid cells and upright members by joining them together by rivets, adhesive or welding.

Each side has a pivoting arm positioned in the center thereof, each pivoting arm has a rail contactor at either end and being pivoted around a central point of the pivoting arm corresponding to a balance point of the device, and there is an tilt sensor attached to each of the pivoting arms for measuring the angle of the pivoting arm in relation to a horizontal level.

The tilt sensor can be an inclinometer, a accelerometer with a gyroscope or any other measuring equipment.

The shape of the device is in the form of a rectangular frame or the device has a cross shape with a pivotable arm mounted on each of the cross-members, the device is in the form of attachments to the lifting platform of the container handling vehicle.

The pivotable arms have movable weights attached to ensure the pivot points are exactly aligned with the center of gravity and the body can have a skirt covering at least one pivoting arm.

In a second aspect, the invention concerns a method for assessing a top of a framework structure of a storage grid in an automated storage and retrieval system wherein the framework structure comprises a rail system comprising a first set of parallel rails arranged to guide movement of a container handling vehicle in a first direction across the top of the framework structure, and a second set of parallel rails arranged perpendicular to the first set of rails to guide movement of the container handling vehicle in a second direction across the top of the framework structure that is perpendicular to the first direction, the first and second sets of parallel rails dividing the rail system into a plurality of grid cells, the framework structure comprising upright members to support the rail system and at least one container handling vehicle operating on the rail system, and wherein the method comprises the steps of arranging the container handling vehicle in a predetermined position on the grid, lowering the device onto a predetermined grid cell so that rail contactors of a pair of pivoting arms, each pivoting around a central point of the arm on opposing sides of the device, resting in the track of a rail on opposite sides of the grid cell measuring, on at least one of the sides of the device, the angle of the pivoting arm in relation to a horizontal level using an tilt sensor, and lifting the device from the rail system and transporting it to the next destination.

Further, plotting a level of deviation of each grid cell in the map and outputting the map, generating a map using the measurements of the individual grid cells.

Also, checking for gaps between the rails of the grid cell and upright members using a camera and mending gaps between the rails of the grid cell and the upright members by joining one or more of them together by rivets, adhesive and/or welding and using different colours for indicating the severity of level deviation in a grid cell.

In a third aspect, the invention concerns a map displaying the level of deviation of each grid cell in an automated storage and retrieval system generated by the method described in the second aspect and the device described in the first aspect.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
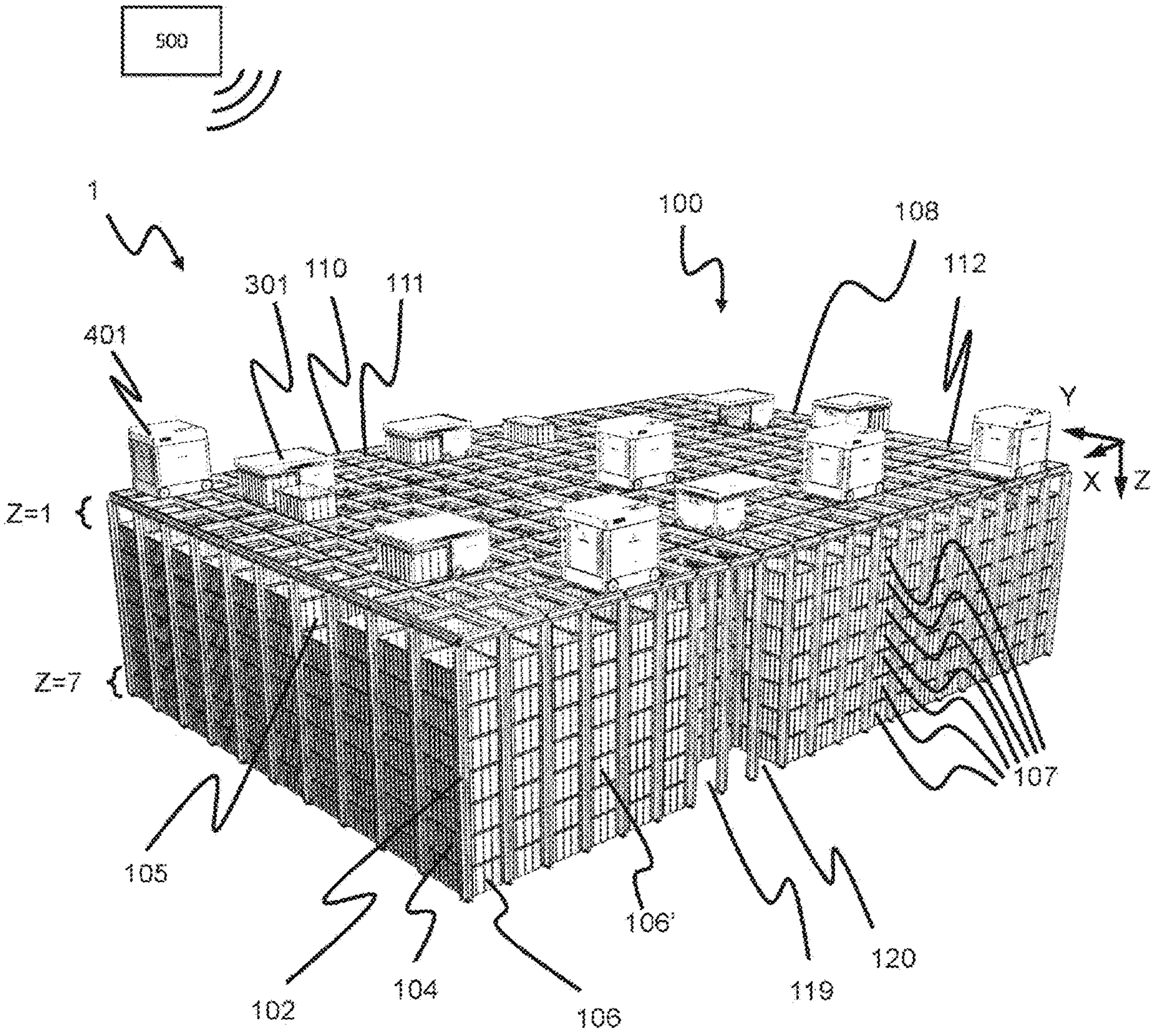
FIG. 1 (Prior Art)
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-2, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of such an automated storage and retrieval system is shown in FIG. 1 as a perspective view of a framework structure of a prior art automated storage and retrieval system.

Figure 2:
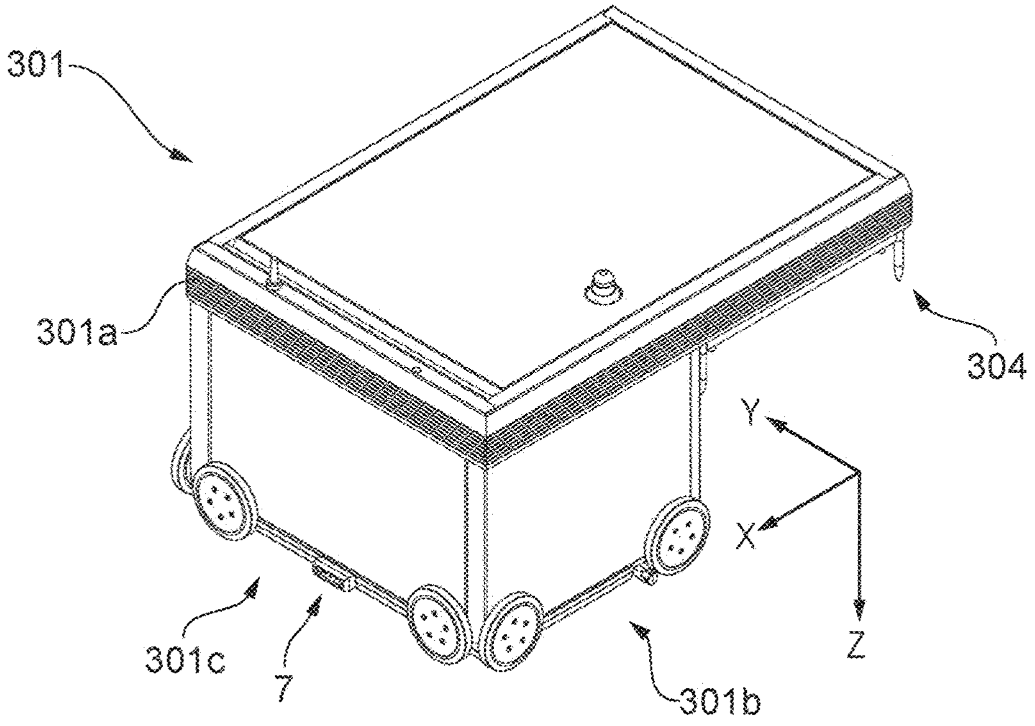
FIG. 2 (Prior Art)
FIG. 2 is a perspective view of a prior art container handling vehicle having a cantilever for carrying storage containers underneath.

FIG. 2 is a perspective view of a prior art container handling vehicle having a cantilever for carrying e.g. storage containers underneath.

Figure 3:
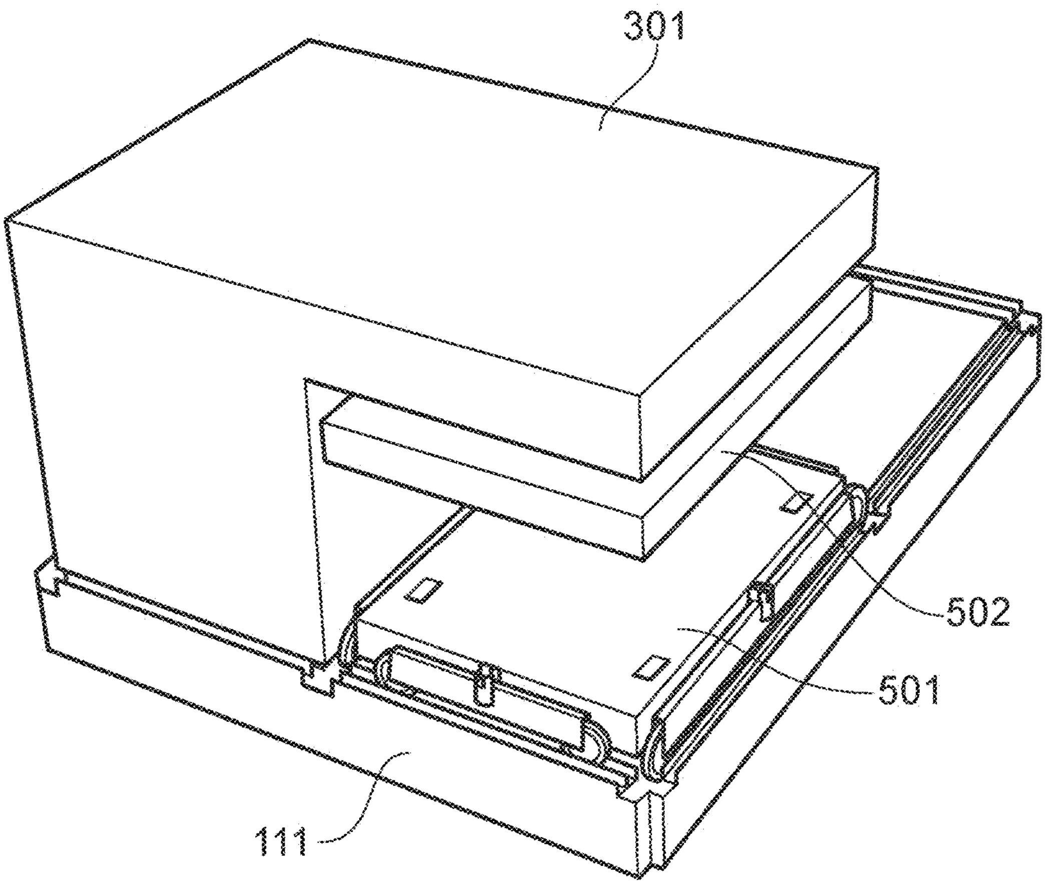
FIG. 3 is a perspective view of a preferred embodiment of the container handling vehicle where a grid assessment device is placed on the rails of a grid system.

FIG. 3 is a perspective view of a preferred embodiment of the container handling vehicle where a grid assessment device 501 is placed on the rails of a grid system.

In a preferred embodiment of the present invention, a container handling vehicle is given the order of picking up a grid assessment device 501. Further the container handling vehicle is given a set of coordinates, from a central computer system, to start performing the assessment of the levelness of the grid top of the storage and retrieval system.

The container handling vehicle carries the grid assessment device 501 out to the coordinates transmitted from the central computer system. The grid assessment device 501 is lowered onto the place described by the central computer system. The grid assessment device 501 performs the required measurements and the device is picked up and carried to its next destination by a container handling vehicle. The location of the next destination is transmitted to a container handling vehicle by the central computer system.

The next destination can be another place on the grid, or it can be to be placed back in storage until the next time there is a need for estimating the levelness of either a part of the grid or the entire grid.

If the grid assessment device 501 is to perform assessments of the levelness of an area of the grid, or the entire grid, the order of where the measurements are performed may depend on several parameters.

One such parameter might be that the grid assessment is to be done while the storage and retrieval system is operational and therefor the measurements may be performed in the order where the container handling vehicle that carries the grid assessment device 501 around is not in the way of the operation of the rest of the container handling vehicles on the grid. However, it may want to be adjacent to an area of the grid that is of interest when the area of interest has container handling vehicles operating on it, e.g., to monitor the rail system for movement under load. The order of where the measurements are performed might therefor be coordinated with the movement, tasks, and targets that the rest of the container handling vehicles are performing.

Alternatively, the order of the measurements of the grid assessment device 501 might be column by column in either an area of the grid or the entire grid. A result of this strategy is that the rest of the container handling vehicles are dependent on the grid assessment and therefor either parts of the grid or the entire grid is closed down.

When a new storage and retrieval system is installed, an assessment of the levelness of the entire grid might be necessary in order to see if there are areas of the grid that needs to be corrected before the containers are transported into the system. This may also be necessary in order to have a first assessment to see the development of the levelness of the grid as time goes by.

The grid assessment device 501 is comprised of a main body 501. The main body can have the form as a rectangular platform made to fit over a column in the grid. However, the main body can also be a rectangular frame, with sides of the rectangular frame aligned with the inside edges of the rails, or a cross-shaped body with two arms placed, so as each arm is placed at the center of each side of the grid column opening, or other suitable shape to extend over the grid opening and position the pivotal arms for contact with the rails.

Figure 4:
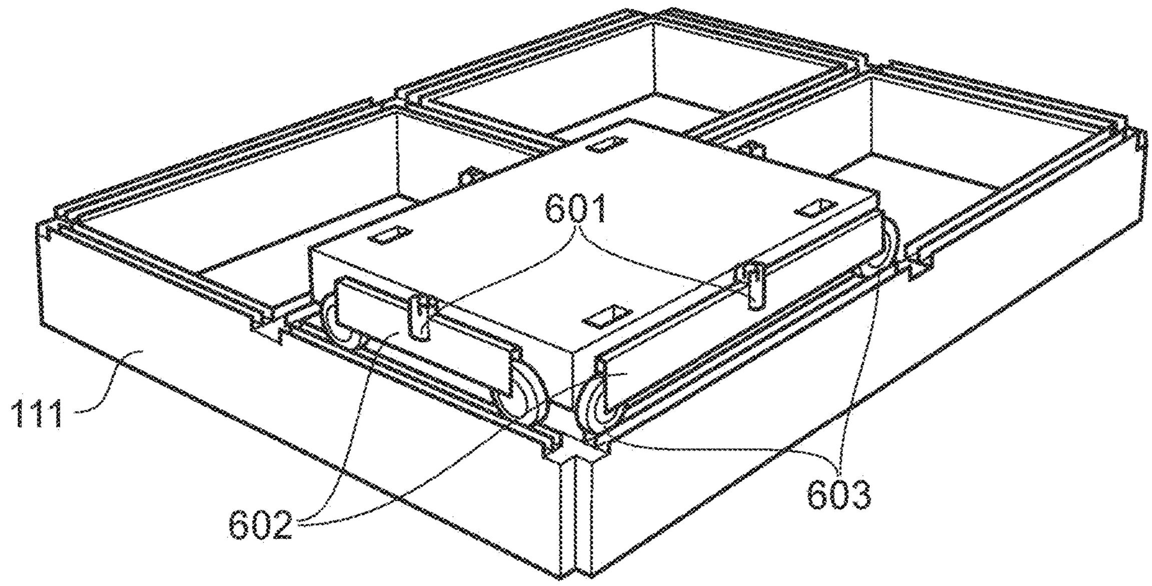
FIG. 4 is a perspective view of the grid assessment device from FIG. 3 placed over a grid column.

FIG. 4 is a perspective view of the grid assessment device 501 from FIG. 3 placed over a grid column.

Here we describe the parts of the grid assessment device 501 the rail contactors, which might be in the form of feet, e.g., as stands, spikes, etc., and/or wheels or other device allowing movement along the rails, with the pivoting arms 602 centered on sides of the main body.

Thus, to the main body there is attached at least one pivoting arm 602. In a preferred embodiment there are four pivoting arms 602 attached to the main body. The pivoting arms 602 are centered at a pivoting point, this pivoting point being preferably at the center of each side of the main body (or at least on an axis which extends in an X or Y direction of the grid and which passes through a vertical axis marking a center of gravity for the grid assessment device 501, if the center of gravity for some reason does not align with the center of the grid assessment device).

The main body could also be either longer or wider than the illustrated embodiment and the pivots for the arms could be housed at the sides within the perimeter of the main body.

At the end of each pivoting arm 602 there is a rail contactor 603. The rail contactor 603 can be a stand, a spike, or a wheel. The rail contactor 603 rests in the rails around the column. The rail contactors 603 on each side is of the same size. When the rail contactors 603 rest in the rails around a column, the pivoting arm 602 will be able to pick up any unevenness on that side of the column opening. If one side of the rail is higher than the other, the pivoting arm 602 will pivot around its pivoting point. To the pivoting point there is attached a device for measuring the angle the pivoting arm 602 has compared to a level plane.

The measuring device can be a tilt sensor 701 like a inclinometer, an accelerometer with a gyroscope or a Wheatstone bridge or any other device capable of measuring small differences in the level of a pivoting arm 602.

Figure 5:
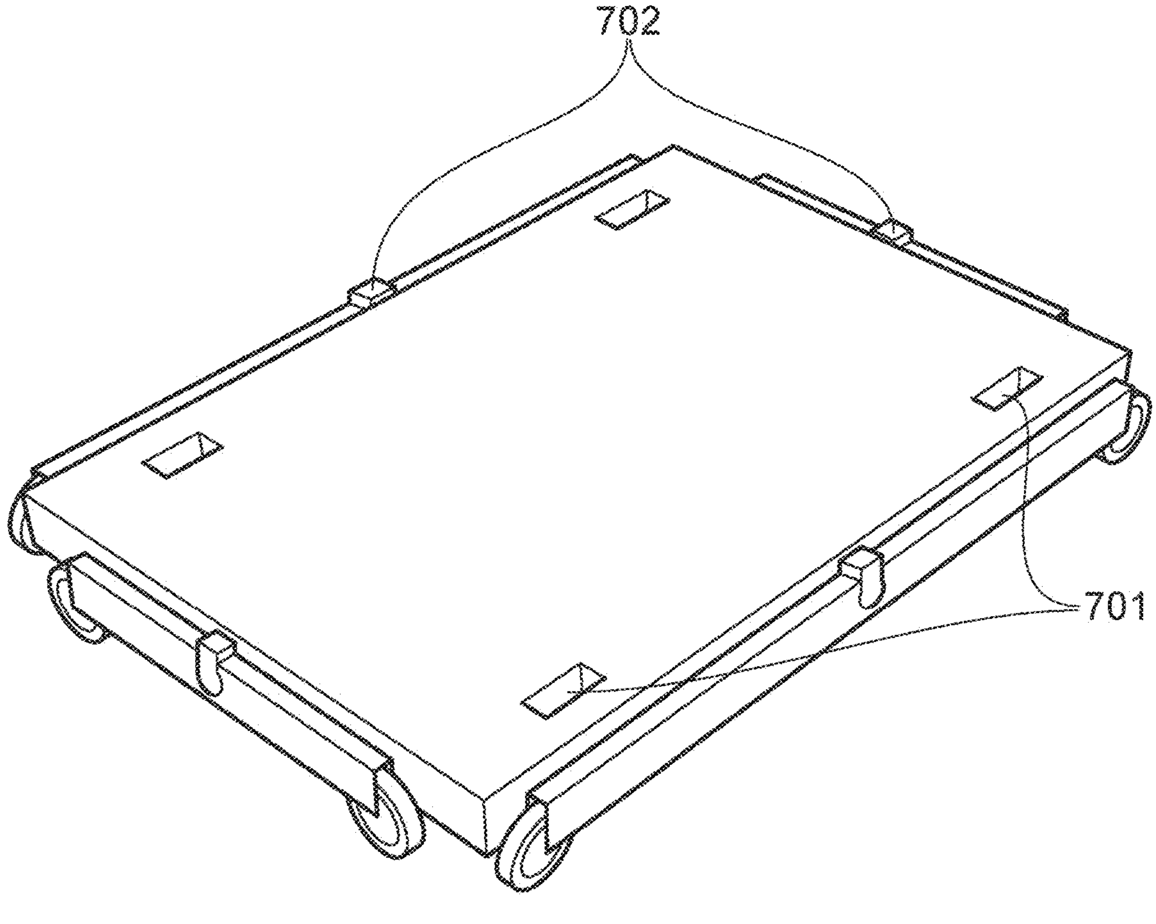
FIG. 5 is a perspective view of the top of the grid assessment device from FIG. 3.

FIG. 5 is a perspective view of the top of the grid assessment device 501 from FIG. 4. Here the openings for receiving the gripping arms of the lifting platform is shown. This makes it possible for the container handling vehicle to pick up the device and carry it around.

Further, in an alternative embodiment, the vehicle-portable grid assessment device 501 can be a modification of the lifting platform of the container handling vehicle itself. If a frame or a kit is attached to the lifting device of the container handling vehicle. In one solution the guiding pins of the lifting frame 502 can be detached, and a frame structure can be attached to where the guiding pins where attached. It is then possible to use the lifting platform of the container handling vehicle as the measuring device. This also makes it a lot cheaper to equip several container handling vehicles with a vehicle-portable grid assessment device 501.

In an even further embodiment of the present invention the guiding pins can be removed from the lifting platform of the container handling vehicles and put on the pivoting arms 602 as rail contactors 603. Although more rail contactors 603 might be needed, it illustrates that the rail contactors 603 can be the same shape as the guiding pins.

The vehicle-portable grid assessment device 501 can be individual sides that are attached to the sides of the lifting platform of the container handling vehicle. This goes to show that the vehicle-portable grid assessment device 501 can be easily attached to the lifting platform of the container handling vehicle.

Figure 6:
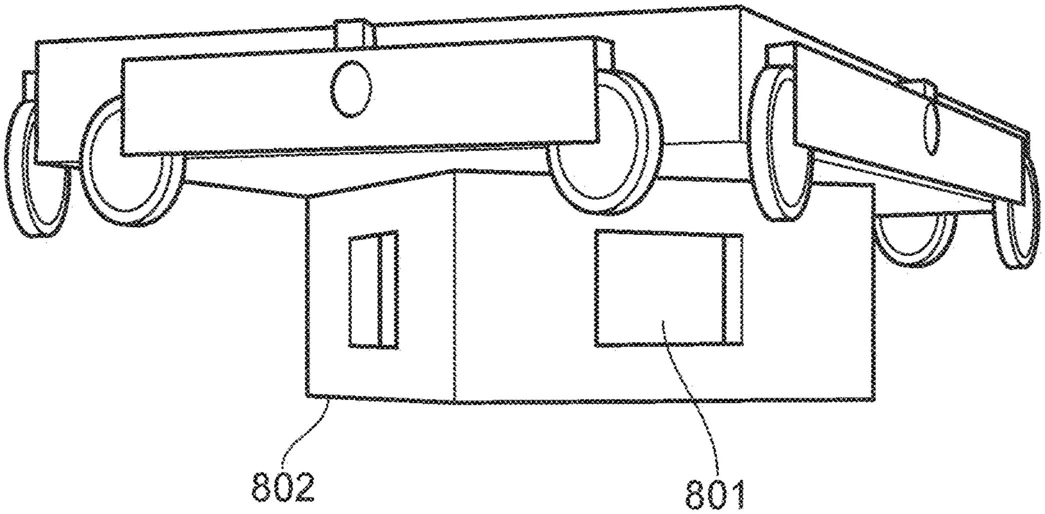
FIG. 6. is a side view of an alternative embodiment of the grid assessment device with a unit for inspecting the cause of any unevenness in the grid top.

FIG. 6. is a side view of an alternative embodiment of the grid assessment device 501 with a unit for inspecting the cause of any unevenness in the grid top.

Here it is displayed an alternative embodiment of the present invention where the vehicle-portable grid assessment device 501 has an attachment 802 at the bottom. This attachment 802 reaches into the column opening. The attachment 802 device is in the form of a box shape that extends downwards from the bottom of the vehicle-portable grid assessment device 501. The attachment 802 can be turned 45° in relation to the vehicle-portable grid assessment device 501 itself. This makes it easier for cameras attached to the sides of the attachment 802 to film the connections between the upright members and the tracks (e.g. through windows 801) in order to see if there are any problems between the upright members and the tracks making out the grid that is cause to the uneven grid section.

There can be either one camera that is capable of turning around in order to film all four of the upright members and the grid connections, this camera might also be able to rotate in more than one dimension in order to be able to inspect more of the upright members.

Figure 7:
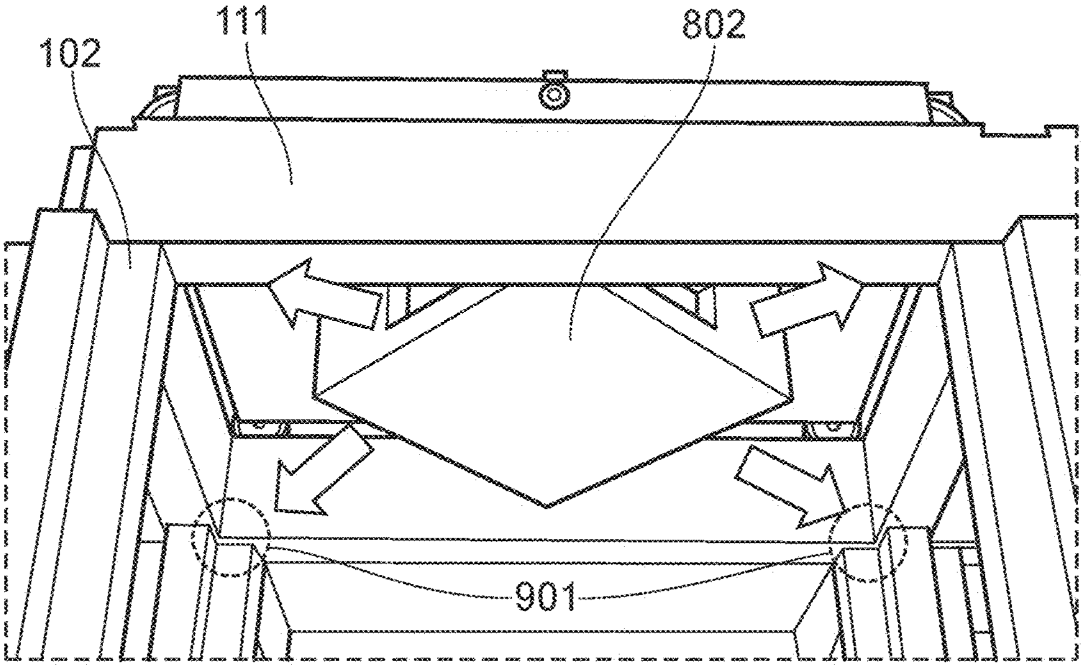
FIG. 7 is a perspective view of the underside of the alternative embodiment presented in FIG. 6 of the grid assessment device.

FIG. 7 is a perspective view of the underside of the alternative embodiment presented in FIG. 6 of the grid assessment device 501.

In an alternative embodiment of the present invention the attachment 802 might container four cameras each filming an upright member through windows 801.

In addition to the embodiments mentioned in FIGS. 6 and 7 the attachment device 802 might have robotic arms attached that is capable of repairing any problems that might be the cause of the unevenness in the grid.

Alternatively, the arms can be attached to a rotating platform. The camera can therefore also be attached to the rotating platform and the arms follow the movement of the camera and the platform. Although stationary cameras might be cheaper, you would need four of them in order to cover all the sides in the column, and the operation of the arms may be more complicated. Alternatively, other camera arrangements may be provided, e.g., a rotatable mirror or other arrangement for viewing a wider region below the grid.

The solution presented here is a solution where an operator is checking the camera and guiding the arms. However, in yet another alternative the entire operation with the vehicle-portable grid assessment device 501 and the attachment can be operated automatically and the camera placed in connection with the attachment of the vehicle-portable grid assessment device 501 might be changed with a sensor that detects any problems with the connections between the upright members and the grid section.

The input from the sensor might be used for guiding the robotic arms when they are fixing the problem.

The problem might be fixed by either welding or riveting or using an adhesive or similar. If the vehicle-portable grid assessment device 501 with the attachment are not capable of solving the problem, the information can be sent to the central computer system so that it can bring the information to attention to personnel that can fix the problem.

In the preceding description, various aspects of the delivery vehicle and the automated storage and retrieval system according to the invention have been described with reference to the illustrative embodiment. For purposes of explanation, specific numbers, systems, and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4):

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)

110*a* First rail in first direction (X)
110*b* Second rail in first direction (X)
111 Parallel rail in second direction (Y)
111*a* First rail of second direction (Y)
111*b* Second rail of second direction (Y)
112 Access opening
119 First port column
120 Second port column
301 Prior art cantilever container handling vehicle
301*a* Vehicle body of the container handling vehicle 301
301*b* Drive means in first direction (X)
301*c* Drive means in second direction (Y)
501 Vehicle-portable grid assessment device
502 Lifting frame
601 Central point of the pivoting arm
602 Pivoting arm
603 Rail contactor
701 Tilt sensor
702 Holes for lifting frame grippers
801 Window for camera
802 Attachment for camera
901 Gap between tracks and upright members.
Y Second direction
Z Third direction

The invention claimed is:

1. A vehicle-portable grid assessment device capable of being lowered onto a rail system device for assessing a top of a framework structure of a storage grid in an automated storage and retrieval system, wherein the framework structure comprises a rail system comprising a first set of parallel rails arranged to guide movement of a container handling vehicle in a first direction across the top of the framework structure, and a second set of parallel rails arranged perpendicular to the first set of rails to guide movement of the container handling vehicle in a second direction across the top of the framework structure that is perpendicular to the first direction, the first and second sets of parallel rails dividing the rail system into a plurality of grid cells, the framework structure comprising upright members to support the rail-system and at least one container handling vehicle operating on the rail system, wherein the device comprises a body with a pivoting arm on at least one side, and each pivoting arm is positioned in the center on each side, each pivoting arm having a rail contactor at either end and being pivoted around a central point of the pivoting arm corresponding to a balance point of the device, and wherein a tilt sensor is attached to at least one of the pivoting arms for measuring the angle of the pivoting arm in relation to a horizontal level.

2. The device according to claim 1, wherein the rail contactors are either feet or wheels that rest in tracks of the rails when performing the measurements.

3. The device according to claim 1, wherein the tilt sensor can be an inclinometer, an accelerometer, or a Wheatstone bridge, or any other device capable of measuring small differences in the level of a pivoting arm.

4. The device according to claim 1, wherein the device is lifted and lowered onto a grid cell by a lifting platform of a container handling vehicle.

5. The device according to claim 1, wherein the device communicates wirelessly with a container handling vehicle carrying the device.

6. The device according to claim 4, wherein the platform communicates wirelessly with a central control unit.

7. The device to claim 4, wherein the platform communicates with the container handling vehicle carrying the device via grippers on the lifting platform.

8. The device according to claim 4, wherein at least one camera is attached to the underside of the platform for inspecting gaps between the rails and the upright members.

9. The device according to claim 1, wherein a robotic arm with tools is attached to the underside of the body for mending gaps between the rails of the grid cells and upright members by joining them together by rivets, adhesive, or welding.

10. The device according to claim 1, wherein each side has a pivoting arm positioned in the center thereof, each pivoting arm has a rail contactor at either end and being pivoted around a central point of the pivoting arm corresponding to a balance point of the device, and wherein a tilt sensor is attached to each of the pivoting arms for measuring the angle of the pivoting arm in relation to a horizontal level.

11. The device according to claim 1, wherein the shape of the device is in the form of a rectangular frame.

12. The device according to claim 1, wherein the device has a cross shape with a pivotable arm mounted on each of cross-members.

13. The device according to claim 4, wherein the device is in the form of attachments to the lifting platform of the container handling vehicle.

14. The device according to claim 1, wherein the pivotable arms have movable weights attached to ensure the pivot points are exactly aligned with the centre center of gravity.

15. The device according to claim 1, wherein the body has a skirt covering at least one pivoting arm.

16. A method for assessing a top of a framework structure of a storage grid in an automated storage and retrieval system wherein the framework structure comprises a rail system comprising a first set of parallel rails arranged to guide movement of a container handling vehicle in a first direction across the top of the framework structure, and a second set of parallel rails arranged perpendicular to the first set of rails to guide movement of the container handling vehicle in a second direction across the top of the framework structure that is perpendicular to the first direction, the first and second sets of parallel rails dividing the rail system into a plurality of grid cells, the framework structure comprising upright members to support the rail system and at least one container handling vehicle operating on the rail system, and wherein the method comprises:

arranging the container handling vehicle in a predetermined position on the grid, lowering a device onto a predetermined grid cell so that rail contactors of a pair of pivoting arms, each pivoting around a central point of the arm on opposing sides of the device, resting in a track of a rail on opposite sides of the grid cell measuring, on at least one of the sides of the device, an angle of the pivoting arm in relation to a horizontal level using a tilt sensor, and lifting the device from the rail system and transporting the device to a next destination.

17. The method according to claim 16, comprising plotting a level of deviation of each grid cell in a map and outputting the map.

18. The method according to claim 16, comprising generating a map using the measurements of the individual grid cells.

19. The method according to claim 16, comprising checking for gaps between the rails of the grid cell and upright members using a camera.

20. The method according to claim 16, comprising mending gaps between the rails of the grid cell and the upright members by joining one or more of the gaps together by rivets, adhesive, and/or welding.

21. The method according to claim 19, comprising using different colors for indicating the severity of level deviation in a grid cell.

22. A map displaying the level of deviation of each grid cell in an automated storage and retrieval system using a vehicle-portable grid assessment device capable of being lowered onto a rail system device for assessing a top of a framework structure of a storage grid in the automated storage and retrieval system, wherein the framework structure comprises a rail system comprising a first set of parallel rails arranged to guide movement of a container handling vehicle in a first direction across the top of the framework structure, and a second set of parallel rails arranged perpendicular to the first set of rails to guide movement of the container handling vehicle in a second direction across the top of the framework structure that is perpendicular to the first direction, the first and second sets of parallel rails dividing the rail system into a plurality of grid cells, the framework structure comprising upright members to support the rail-system and at least one container handling vehicle operating on the rail system, wherein the device comprises a body with a pivoting arm on at least one side, and each pivoting arm is positioned in the center on each side, each pivoting arm having a rail contactor at either end and being pivoted around a central point of the pivoting arm corresponding to a balance point of the device, and wherein there is a tilt sensor is attached to at least one of the pivoting arms for measuring an angle of the pivoting arm in relation to a horizontal level, wherein the map is generated by a method comprising:

arranging the container handling vehicle in a predetermined position on the grid, lowering the device onto a predetermined grid cell so that rail contactors of a pair of pivoting arms, each pivoting around a central point of the arm on opposing sides of the device, resting in a track of a rail on opposite sides of the grid cell, measuring, on at least one of the sides of the device, the angle of the pivoting arm in relation to a horizontal level using a tilt sensor, and lifting the device from the rail system and transporting the device to a next destination.

* * * * *